US012605995B2

(12) United States Patent
Schultz

(10) Patent No.: US 12,605,995 B2
(45) Date of Patent: Apr. 21, 2026

(54) IN VEHICLE STORAGE SYSTEM FOR MODULAR HARD TOP SYSTEM PANEL

(71) Applicant: FCA US LLC, Auburn Hills, MI (US)

(72) Inventor: Jason E Schultz, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 425 days.

(21) Appl. No.: 18/308,103

(22) Filed: Apr. 27, 2023

(65) Prior Publication Data

US 2024/0359541 A1 Oct. 31, 2024

(51) Int. Cl.
*B60J 7/11* (2006.01)
*B60J 7/10* (2006.01)
*B60J 7/19* (2006.01)

(52) U.S. Cl.
CPC ................. *B60J 7/106* (2013.01); *B60J 7/11* (2013.01); *B60J 7/194* (2013.01)

(58) Field of Classification Search
CPC ....... B60J 7/106; B60J 7/11; B60J 7/16; B60J 7/1628; B60J 7/1635; B60J 7/1642; B60J 7/194
USPC ............................................ 296/218, 216.09
See application file for complete search history.

(56) References Cited

U.S. PATENT DOCUMENTS

| | | | | |
|---|---|---|---|---|
| 4,940,283 | A * | 7/1990 | Androy ...................... | B60J 7/04 |
| | | | | 296/218 |
| 6,942,286 | B2 * | 9/2005 | Bohm ...................... | B60J 7/047 |
| | | | | 296/220.01 |
| 10,632,825 | B2 * | 4/2020 | Stojkovic ................... | B60J 7/14 |
| 11,465,479 | B2 | 10/2022 | Krapfl | |
| 2015/0224860 | A1 * | 8/2015 | Bowles ...................... | B60J 7/20 |
| | | | | 296/210 |
| 2019/0329638 | A1 * | 10/2019 | Willard .................... | B60J 7/192 |
| 2021/0170848 | A1 * | 6/2021 | Willard .................... | B60J 7/194 |
| 2021/0178874 | A1 * | 6/2021 | Boyle ................... | B60J 1/1853 |
| 2023/0137099 | A1 * | 5/2023 | Durham ..................... | B60J 7/11 |
| | | | | 296/218 |

* cited by examiner

*Primary Examiner* — Roger L Pang

(74) *Attorney, Agent, or Firm* — Jeremy J. Klobucar

(57) ABSTRACT

A vehicle including a body, a first roof support and a second roof support spaced from the first roof support, a roof panel releasably coupled to at least one of the first roof support and the second roof support, and a first panel support surface adjacent to the first roof support and a second panel support surface adjacent to the second roof support. The roof panel is adapted to be released from the first roof support and the second roof support and received between the panel support surfaces and the roof supports.

14 Claims, 5 Drawing Sheets

IN VEHICLE STORAGE SYSTEM FOR MODULAR HARD TOP SYSTEM PANEL

FIELD

The present disclosure relates to a modular hard top system for a vehicle and, more particularly, to a storage system for at least one roof panel.

BACKGROUND

Modular roofs for vehicles may include one or more panels constructed of a hard material (e.g., referred to as a hard top) that define part of the vehicle roof in an installed position and which may be removed to provide an at least partially open roof solution. Such tops provide a user with the benefit of open-air driving while affording available protection in the event of adverse weather conditions. However, the hard top modular roof panels are typically large and storage and handling of the panels can be challenging.

SUMMARY

In at least some implementations a vehicle includes a body, a first roof support and a second roof support spaced from the first roof support, a roof panel, and a first panel support surface adjacent to the first roof support and a second panel support surface adjacent to the second roof support. The first roof support and the second roof support being coupled to or defining part of the body. The roof panel releasably coupled to at least one of the first roof support and the second roof support to define at least part of a roof of the vehicle. The roof panel is adapted to be released from the first roof support and the second roof support and received between the panel support surfaces and the roof supports.

In at least some implementations, the first roof support and the second roof support each comprise a vertical thickness, extend along the vehicle in a fore-aft direction, and the first roof support is spaced from the second roof support in a cross-car direction.

In at least some implementations, the first and second roof supports are configured to support the roof panel when the roof panel is positioned vertically above or below the first and second roof supports.

In at least some implementations, the roof panel is coupled to the first and second roof supports in a first position of the roof panel, and is received between the panel support surfaces and the first and second roof supports in a second position of the roof panel.

In at least some implementations, in the first position or second position, the roof panel is coupled to the first and second roof supports with mechanical fasteners.

In at least some implementations, the vehicle further includes a vehicle interior comprising a passenger compartment and a cargo compartment, wherein the first and second panel support surfaces are outboard of the passenger compartment and overlap a portion of the cargo compartment.

In at least some implementations, the first panel support surface is integrally formed in the first roof support and the second panel support surface is integrally formed in the second roof support.

In at least some implementations, the vehicle further includes a second roof panel coupled to the first and second roof supports, the roof panels comprising an outer surface and an opposite inner surface, wherein the outer surface of the releasable roof panel is adjacent the inner surface of the second roof panel when the releasable roof panel is positioned vertically beneath the second roof panel.

In at least some implementations, the vehicle further includes a third roof panel coupled to the roof supports and is spaced apart from the second roof panel in the fore-aft direction, wherein an uninterrupted opening exists when the releasable roof panel is positioned beneath the second roof panel.

In at least some implementations, a vehicle includes a first roof support and a second roof support spaced laterally from the first roof support, a first roof panel, a second roof panel, a third roof panel, and a first panel support surface adjacent to the first roof support and a second panel support surface adjacent to the second roof support. The first roof panel removably attached to at least one of the first roof support and the second roof support to define at least part of a roof of the vehicle. The second roof panel and the third roof panel both coupled to the first roof support and the second roof support defining an opening in the roof of the vehicle. The first roof panel is adapted to be released from the first roof support and the second roof support and received between the panel support surfaces and the roof supports.

In at least some implementations, the roof supports extend along the vehicle in a fore-aft direction and include one or more fastener holes which are positioned to correspond to one or more fastener openings formed in the roof panels.

In at least some implementations, the fastener holes each include a threaded bushing.

In at least some implementations, the fastener holes each include a weld nut assembly.

In at least some implementations, the vehicle further includes an exterior and an interior comprising a passenger compartment and a cargo compartment, wherein the first roof panel is positioned to define a portion of the exterior of the vehicle above the passenger compartment in a first position, and positioned in the interior of the vehicle in the cargo compartment in a second position.

In at least some implementations, the first roof panel is removably attached to at least one of the first roof support and the second roof support in the second position and defines at least part of the interior of the vehicle.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
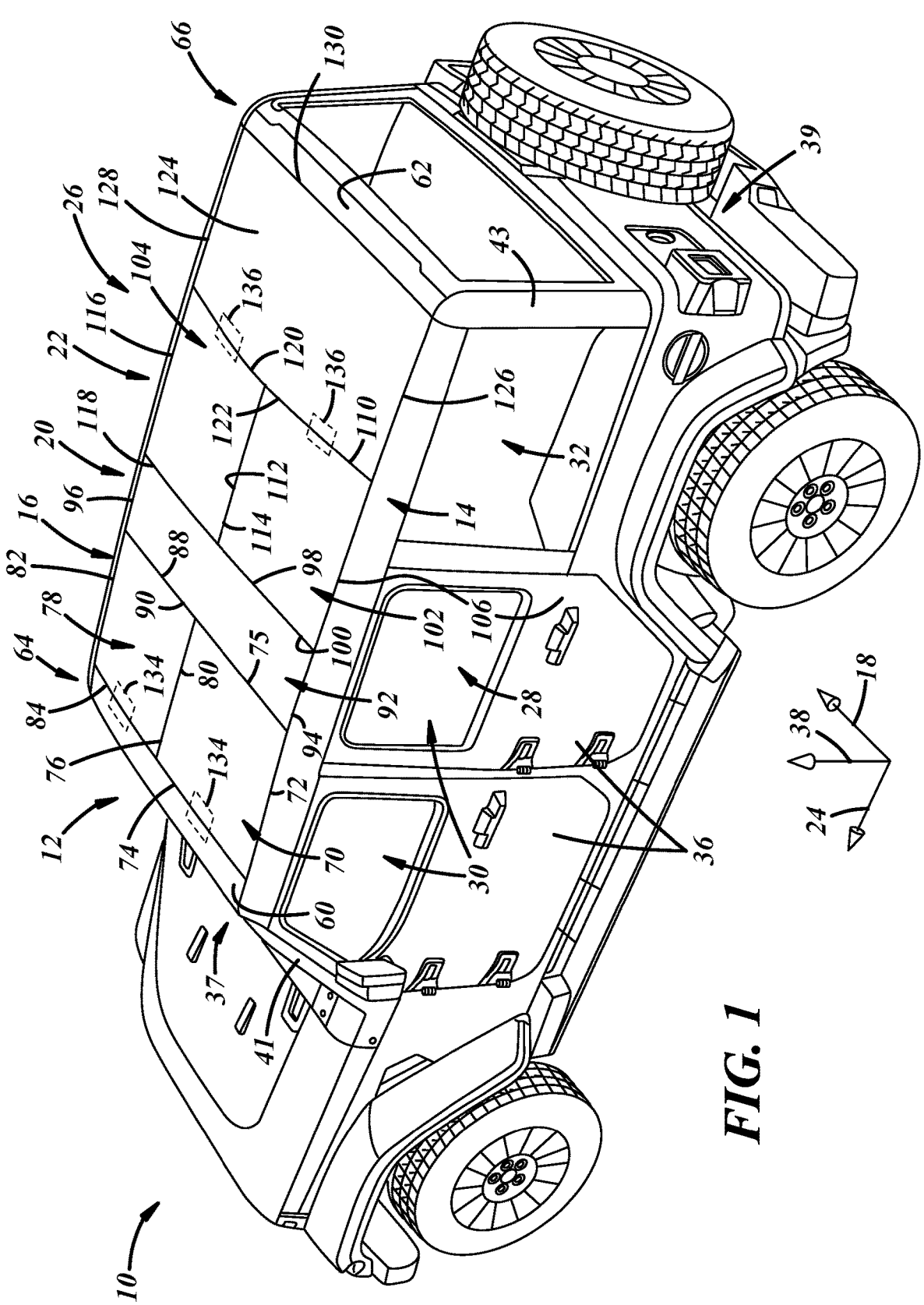
FIG. 1 is a perspective view of a vehicle including a modular hard top roof with at least one removable roof panel.

Referring in more detail to the drawings, FIG. 1 illustrates a vehicle 10 including a body 12, a first roof support 14 and a second roof support 16 spaced from the first roof support 14 in a cross-car direction (indicated by arrow 18) and coupled to or defining part of the body 12, and at least one roof panel 20 releasably coupled to at least one of the roof supports 14, 16 and defining at least part of a roof 22 of the vehicle 10. The vehicle 10 may be a passenger vehicle having driver and passenger sides that are laterally spaced apart in the cross-car direction 18, which is perpendicular to a fore-aft direction that is indicated by arrow 24 in FIGS. 1 and 2 and extends between a front end and rear end of the vehicle. A vertical direction is defined between the roof 22 and a lower surface or floor (not shown), and is perpendicular to the cross-car and fore-aft directions 18, 24, and is shown by arrow 38 in FIGS. 1 and 2.

With reference to FIG. 1, the vehicle 10 includes an exterior 26 and an interior 28. The vehicle interior 28 may be defined by a passenger compartment 30 and a cargo compartment 32. The passenger compartment 30 may include one or more seats, and is defined between an inner surface 34 (FIG. 2) of the roof 22, a lower surface or floor (not shown) of the vehicle 10, the driver and passenger sides of the vehicle 10, which may include one or more doors 36, a dashboard and windshield 37 at the front of the passenger compartment, and a rear most seat at the back of the passenger compartment. In the example shown, the cargo compartment 32 is open to the passenger compartment 30, and located between a rear most seat of the vehicle and a rear door, sometimes called a liftgate or tailgate 39. Other arrangements may be used, as desired.

Figure 2:
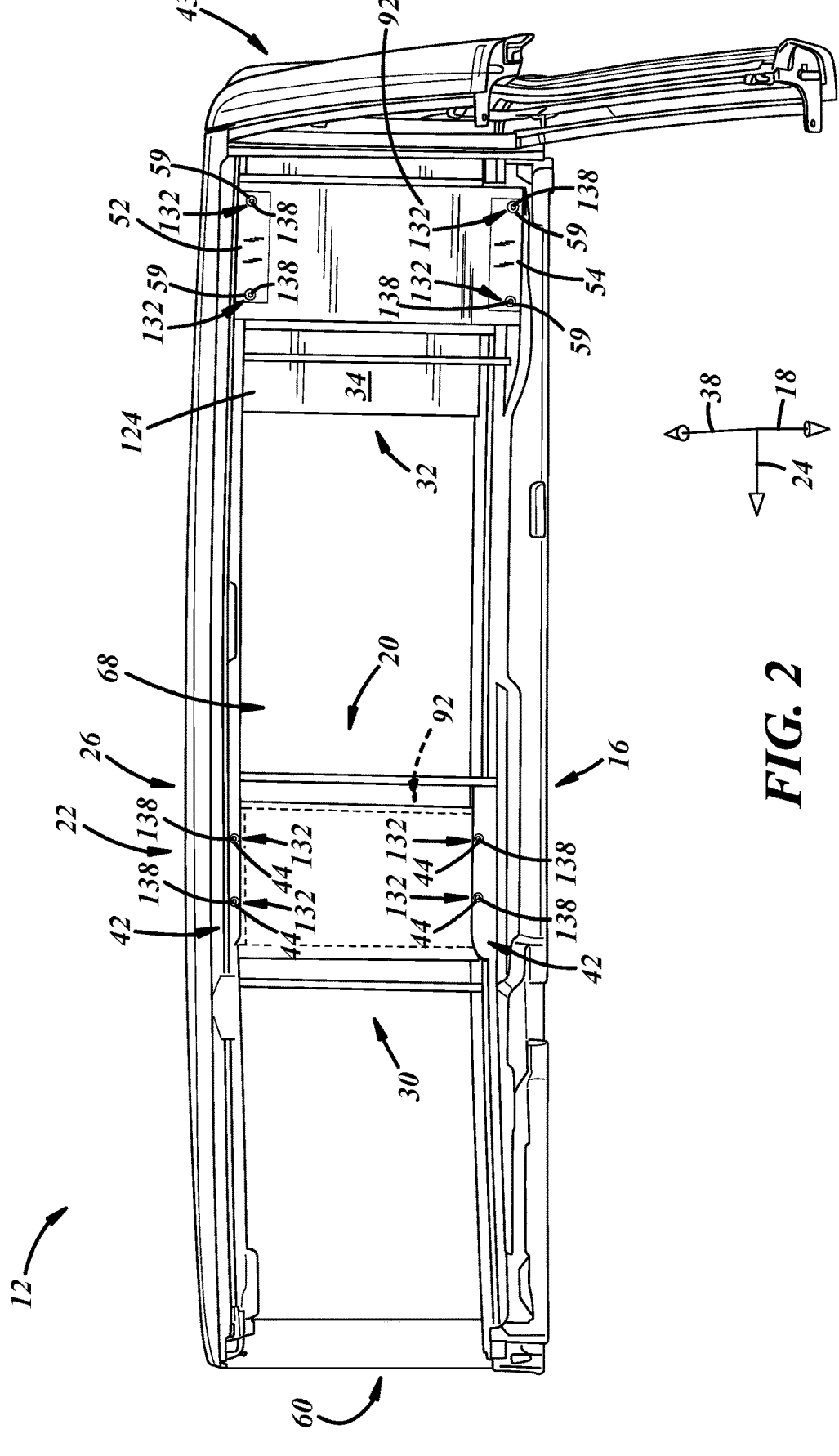
FIG. 2 is a fragmentary perspective view, showing the removable roof panel in a first position and second position.
Figure 4:
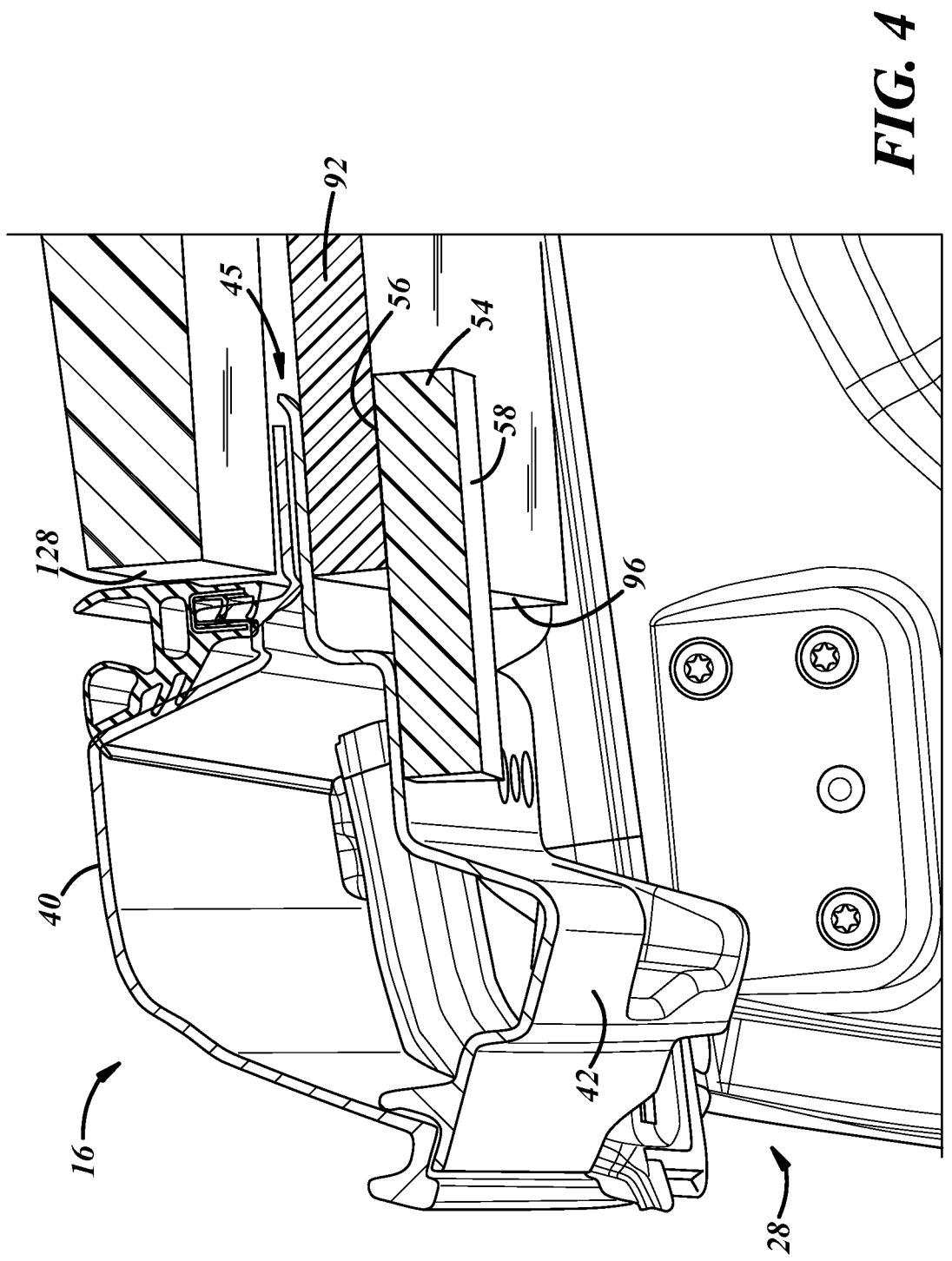
FIG. 4 is a cross-sectional view of the roof panel, the roof support, and a panel support surface.
Figure 5:
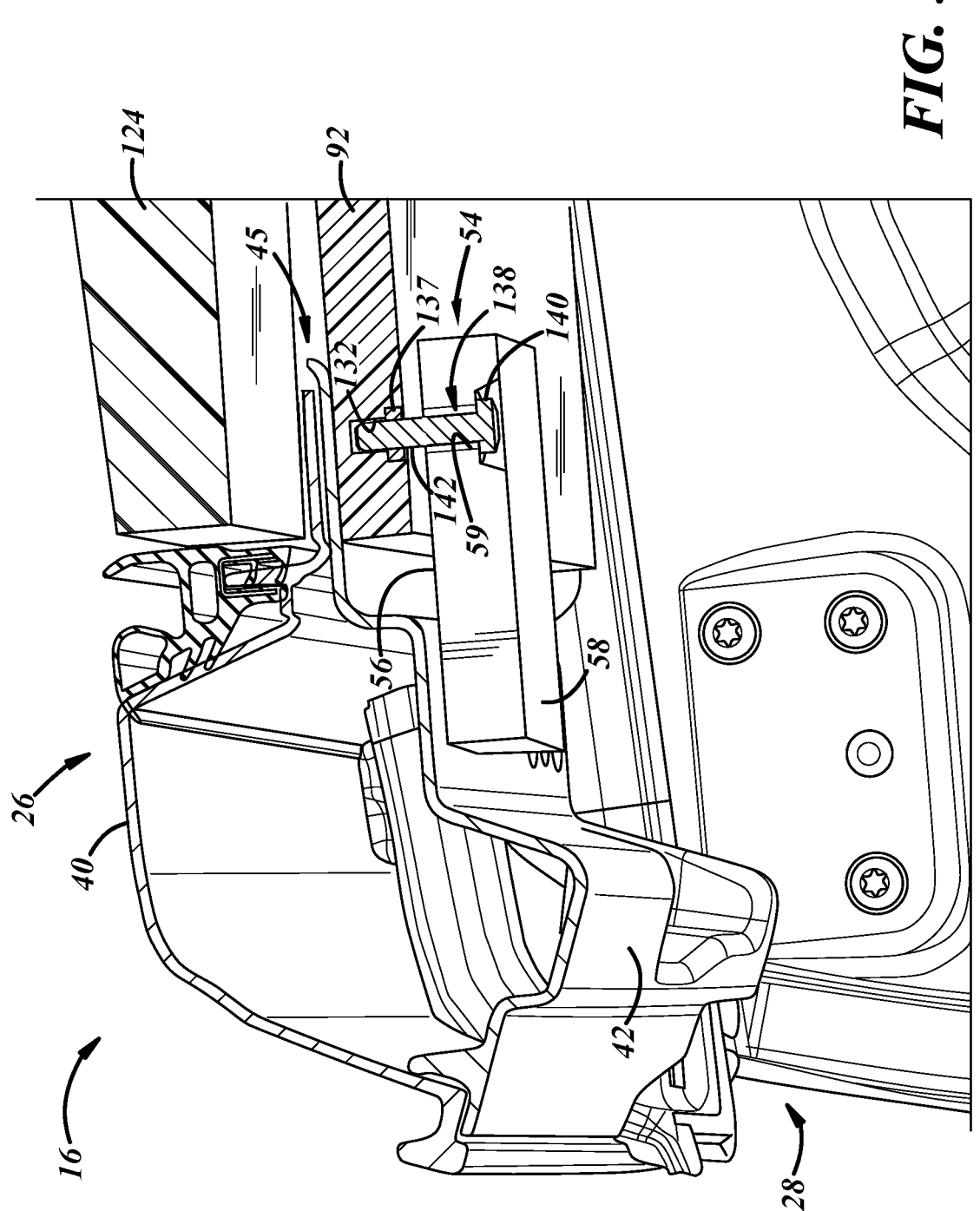
FIG. 5 is a cross-sectional view of the roof panel, the roof support, the panel support surface, and a fastener.

With reference to FIGS. 1 and 2, the first roof support 14 and second roof support 16 are spaced apart in the cross-car direction and each extends in the fore-aft direction from a front pillar 41, to a rear pillar 43 which extend generally vertically from the vehicle body up to the roof 22. FIGS. 4 and 5 show a cross-sectional view of the second roof support 16, and the first roof support 14 may be a mirror-image of the second roof support 16. As best shown in FIGS. 4 and 5, the second roof support 16 includes a vertical thickness extending between an exterior surface 40 and an interior surface 42. The exterior surface 40 defines part of the vehicle exterior 26 and the interior surface 42 defines part of the vehicle interior 28, although the interior surface 42 is typically covered by an interior trim piece and/or fabric headliner defining a ceiling or upper surface of the passenger compartment. As shown in FIG. 2, the interior surface 42 may also comprise one or more fastener holes 44 spaced fore-aft along the length of the of the roof supports 14, 16. As shown in FIG. 5, the second roof support 16 includes a flange 45 that extends inwardly in a cross-car direction. The second roof support 16 is shown as being formed by two halves that are welded or otherwise joined together to define a hollow center, but could be formed in a single piece, or more than two pieces of material, as desired.

Figure 3:
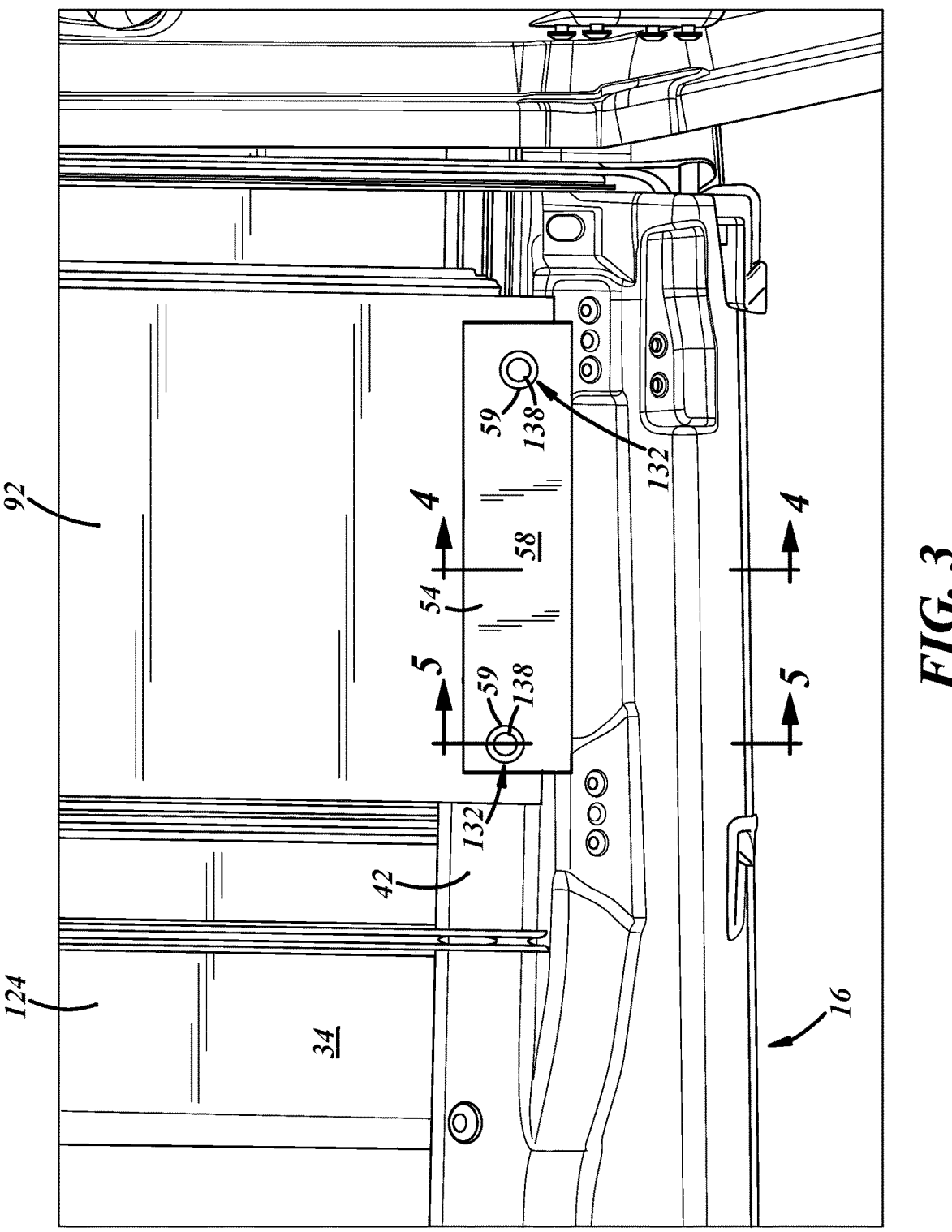
FIG. 3 is a fragmentary perspective view of the vehicle including the roof panel, a roof support, and a panel support surface.

As shown in FIG. 2, a first panel support surface 52 may be adjacent to the first roof support 14 and a second panel support surface 54 may be adjacent to the second roof support 16. As shown in FIGS. 3 and 4, the first and second panel support surfaces 52, 54 each include a top side 56 and a bottom side 58, the top side 56 of the panel support surface 52, 54 being adjacent the interior surface 42 of the roof support 16. FIGS. 4 and 5 show a cross-sectional view of the second panel support surface 54, and the second panel support surface 54 may be a mirror-image of the first panel support surface 52. As best shown in FIG. 5, the second panel support surface 54 includes at least one fastener hole 59 extending between the top side 56 and the bottom side 58. With reference to FIG. 2, the first panel support surface 52 may be attached to the first roof support 14 such that the first panel support surface 52 is outboard of the passenger compartment 30 and overlaps a portion of the cargo compartment 32. Similarly, the second panel support surface 54 may be attached to the second roof support 16 such that the second panel support surface 54 is outboard of the passenger compartment 30 and overlaps a portion of the cargo compartment 32, and is aligned in the fore-aft direction with the first panel support surface 52. The first panel support surface 52 and second panel support surface 54 may be integrally formed in the first roof support 14 and second roof support 16, respectively. For example, as shown in FIG. 4, the second panel support surface 54 is integrally formed with the interior surface 42 of the second roof support 16 and extends inwardly in the cross-car direction. In at least some implementations, the first and second panel support surfaces 52, 54 may be respectively coupled to the first and second roof supports 14, 16 via other means, for example, with mechanical fasteners, welds, or with an adhesive.

As shown in FIG. 1, the roof 22 also includes a front cross-member 60 and a rear cross-member 62 spaced from each other in the fore-aft direction. The front cross-member 60 extends in the cross-car direction and may be coupled to the front pillars 41, the first roof support 14, the second roof support 16, and the windshield 37, to define a front end of the roof 64. The rear cross-member 62 extends in the cross-car direction and may be coupled to the rear pillars 43, the first roof support 14, the second roof support 16, and a portion of the body 12 which supports the tailgate 39, to define a rear end of the roof 66. So formed, the first roof support 14, the second roof support 16, the front cross-member 60, and the rear cross-member 62 define a peripheral frame for the roof 22 and an opening 68 (FIG. 2) between them.

With continued reference to FIG. 1, the roof 22 includes multiple roof panels and may include releasable and not releasable (i.e., fixed) roof panels. For instance, a first front panel 70 has a left side 72 supported by the first roof support 14, a front side 74 supported by the front cross-member 60, a rear side 75 spaced in the fore-aft direction from the front side 74, and a right side 76 spaced from the left side in the cross-car direction. The first front panel 70 may be releasably coupled to the first roof support 14 and adjacent panels, and is shown as being received over a forward portion of the passenger compartment on the driver's side of the vehicle (in this implementation, recognizing that the driver's side of a vehicle is different in different portions of the world). In the example shown, the first front panel 70 spans about ½ of the cross-car distance between the first roof support 14 and the second roof support 16.

The roof 22 in the implementation shown further includes a second front panel 78 having a left side 80 coupled to the right side 76 of the first front panel 70, a right side 82 that is supported by the second roof support 16, a front side 84 supported by the front cross-member 60, and a rear side 88 spaced in the fore-aft direction from the front side 84. The second front panel 78 may be releasably coupled to the second roof support 16 and adjacent panels, and is shown as being received over a forward portion of the passenger compartment 30 on the passenger's side of the vehicle (in this implementation, recognizing that the passenger's side of a vehicle is different in different portions of the world). In the example shown, the second front panel 78 spans about ½ of the cross-car distance between the first roof support 14 and the second roof support 16. While shown as two separate panels, the front panels 70 and 78 can be a single panel that spans between and is connected to both roof supports 14, 16. Further, while shown as being releasably coupled to the roof supports 14, 16, the front panels 70, 78, or a substituted single panel, could be fixed and not releasably mounted to the roof supports 14, 16.

The rear sides 75, 88 of the first and second front panels 70, 78 may be aligned and coupled to or supported by a front side 90 of a first intermediate panel 92. The first intermediate panel 92 includes a left side 94 supported by the first roof support 14, a right side 96 supported by the second roof support 16, and a rear side 98 in contact with a front side 100 of a second intermediate panel 102 and a front side of a third intermediate panel 104. The first intermediate panel 92 overlies a mid-portion of the passenger compartment 30, behind the front panels 70, 78. While shown and described as being a single panel releasably coupled to both of the roof supports 14, 16, the first intermediate panel 92 could be fixed to the roof supports and/or formed in more than one piece (i.e., could be defined by multiple panels).

The second intermediate panel 102 has a left side 106 supported by the first roof support 14, a rear side 110 spaced in the fore-aft direction from the front side 100, and a right side 112 spaced from the left side 106 in the cross-car direction. The second intermediate panel 102 may be releasably coupled to the first roof support 14 and adjacent panels, and is shown as being received over a rear portion of the passenger compartment 30 and over a front portion of the cargo compartment 32 on the driver's side of the vehicle (in this implementation, recognizing that the driver's side of a vehicle is different in different portions of the world). In the example shown, the second intermediate panel 102 spans about ½ of the distance between the first roof support 14 and the second roof support 16.

The roof 22 in the implementation shown further includes the third intermediate panel 104 which includes a left side 114 coupled to the right side 112 of the second intermediate panel 102, a right side 116 that is supported by the second roof support 16, a front side 118 supported by the rear side of the first intermediate panel 92, and a rear side 120 spaced in the fore-aft direction from the front side 118. The third intermediate panel 104 may be releasably coupled to the second roof support 16 and adjacent panels, and is shown as being received over a rear portion of the passenger compartment 30 and over a front portion of the cargo compartment 32 on the passenger's side of the vehicle (in this implementation, recognizing that the passenger's side of a vehicle is different in different portions of the world). In the example shown, the third intermediate panel 104 spans about ½ of the distance between the first roof support 14 and the second roof support 16. While shown as two separate panels, the second intermediate panel 102 and third intermediate panel 104 can be a single panel that spans between and is connected to both roof supports 14, 16. Further, while shown as being releasably coupled to the roof supports 14, 16, the second and third intermediate panels 102, 104, or a substituted single panel, could be fixed and not releasably mounted to the roof supports 14, 16.

The rear sides 110, 120 of the second and third intermediate panels 102, 104 may be aligned and coupled to or supported by a front side 122 of a rear panel 124. The rear panel 124 includes a left side 126 supported by the first roof support 14, a right side 128 supported by the second roof support 16, and a rear side 130 supported by the rear cross member 62. The rear panel 124 overlies a portion of the cargo compartment 32, behind the second and third intermediate panels 102, 104. While shown and described as being a single panel coupled to both roof supports 14, 16, the rear panel 124 could be fixed to the roof supports 14, 16 and/or formed in more than one piece (i.e., could be defined by multiple panels).

As shown in the present implementation, the roof panels 70, 78, 92, 102, 104, 124 each include an inner surface and an outer surface opposite the inner surface. Thus, each roof panel also includes a vertical thickness extending between the respective inner and outer surfaces. In assembly, appropriate seals are provided near the sides of the roof panels 70, 78, 92, 102, 104, 124, on the cross-members 60, 62, and/or on the roof supports 14, 16 for sound and/or water proofing, if desired. When the roof panels 70, 78, 92, 102, 104, 124 are coupled to the roof supports 14, 16 and supported between the cross-members 60, 62, the exterior surfaces of the panels 70, 78, 92, 102, 104, 124 may be positioned at the same vertical height as (i.e. flush with) the exterior surfaces of the roof supports 14, 16. Of course, other arrangements may be used, as desired.

The roof panels 70, 78, 92, 102, 104 may include one or more fastener openings 132 and/or attachment mechanisms 134, 136 such that they can be releasably coupled to the first and second roof supports 14, 16 in a first position (FIG. 1), and removed from the roof and optionally mounted in a second position (FIG. 2). As shown in FIG. 5, the one or more fastener openings 132 may include a threaded bushing 137 or a weldnut assembly, for example, and the fasteners 138 may be mechanical fasteners which include a bolt head 140 and a threaded shank 142. When the fastener openings 132 of the roof panels 70, 78, 92, 102, 104 are aligned with the fastener holes 44 of the first and second roof supports 14, 16, the shank 142 of each fastener 138 may be inserted vertically upward through the fastener openings 132 and fastened or otherwise coupled to the fastener holes 44 in the respective roof supports 14, 16. In at least some implementations, the fasteners 138 may be quick release fasteners such as ¼ turn fasteners, for example.

The attachment mechanisms 134, 136 may include, for example, a clamping mechanism that engages a hook or catch on the front cross member 60 and the rear roof panel 124, and which may include a cam interface to secure the panels as the clamp is latched. This may be done without having to install threaded fasteners in openings.

The above-described attachment of panels to the various roof support structures is merely an exemplary arrangement. Other components or attachments of the panels may be used, as desired.

To remove the panels 70, 78, 92, 102, 104 from the first position (FIG. 1), a user may remove fasteners 138 from the panels and disengage the attachment mechanisms 134, 136. Some of the panels 70, 78, 92, 102, 104 may be selectively removed from the roof 22 without removing other panels. For instance, the front panels 70, 78 may be removed from the roof without removing the first, second, or third intermediate panels 92, 102, 104. Once the front panels 70, 78 are removed, the first intermediate panel 92 may be removed from the roof 22 without removing the second or third intermediate panels 102, 104.

One or more of the panels 70, 78, 92, 102, 104 may be removed from the roof 22 and moved to the second position (FIG. 2). In the present implementation, as shown in FIG. 2, when the first intermediate panel 92 is in the second position, the panel 92 is situated between the first and second panel support surfaces 52, 54 and the roof supports 14, 16. In this position, the left side 94 and right side 96 of the first intermediate panel 92 overlap the first and second panel support surfaces 52, 54, respectively, in both the vertical and cross car directions.

As shown in FIGS. 4 and 5, the left side 94 and the right side 96 of the first intermediate panel 92 are vertically between the panel support surfaces 52, 54 and the rear roof panel 124 so that the outer surface of the first intermediate panel 92 is adjacent the inner surface of the rear roof panel 124. In the second position, the first intermediate panel 92 may be removably attached to the first and second panel support surfaces 52, 54 so that a portion of the inner surface of the first intermediate panel 92 may be adjacent to or in contact with the top side of the first and second panel support surfaces. In some embodiments, the left side 94 and the right side 96 of the inner surface of the first intermediate panel 92 may include indentations that correspond to the shape of the panel support surfaces 52, 54. Such feature may help locate the first intermediate panel 92 so that the fastener openings 132 easily align with the fastener holes 59 on the panel support surfaces. In any case, once the fastener openings 132 of the panel 92 are aligned with the fastener holes 59 of the second panel support surface 54, the threaded shank 142 of the fasteners 132 may be inserted vertically upward through fastener holes 59 and fastened or otherwise coupled to the threaded bushing 137 of the fastener opening 132.

In the present implementation, when the first intermediate panel 92 is stored beneath the rear roof panel 124 in the second position (FIG. 2), the opening 68 in the roof may be defined by the front cross-member 60, the roof supports 14, 16, and the second and third intermediate panels 102, 104 if they are still releasably coupled to the roof 22. In other words, such arrangement presents a partial opening in the roof 22 over the passenger compartment 30. However, as shown in FIG. 2, when the second and third intermediate panels 102, 104 are also removed from the roof 22, the opening 68 is defined by the front cross-member 60, the roof supports 14, 16, and the rear roof panel 124. Such arrangement presents an uninterrupted opening in the roof over the passenger compartment 30 and over a portion of the cargo compartment 32.

To facilitate securing a roof panel in the second position, the roof panel may be rested on the first and second panel support surfaces 52, 54 so that a user need not hold the panel vertically in position while also trying to secure the fasteners 138. In this way, the first and second panel support surfaces 52, 54 provide temporary support for a panel to facilitate locating and securing the panel in the second position. In the present implementation, four fasteners 138 are used to secure the first intermediate panel 92 to the first and second panel support surfaces 52, 54. However, the number of fasteners necessary to secure the selected panel or panels to the first and second panel support surfaces 52, 54 may be more or less.

The roof system described herein provides a very flexible arrangement in which one or more roof panels may be fixed to roof support structures and one or more panels may be removable from the roof to provide an opening in the roof. A roof panel that is removed from the roof may be stored as desired. In the system described herein, a removed roof panel may be stored beneath another roof panel, which may be a fixed or non-removable roof panel, and support surfaces are provided to facilitate securing the removed panel in a second position that is spaced from its first position. Securing the removed panel prevents it from sliding around or moving relative to the vehicle, and can protect the roof panel and vehicle from damage that may be caused by relative movement between them. The secured panel also does not contact passengers in the vehicle during sudden vehicle movements like during an impact of the vehicle.

What is claimed is:

1. A vehicle comprising:
   a body;
   a vehicle interior including a passenger compartment and a cargo compartment,
   a first roof support and a second roof support spaced from the first roof support, the first roof support and the second roof support being coupled to or defining part of the body, wherein the first roof support and the second roof support each comprise a vertical thickness, extend along the passenger compartment and the cargo compartment in a fore-aft direction, and the first roof support is spaced from the second roof support in a cross-car direction;
   a first roof panel releasably coupled to at least one of the first roof support and the second roof support to define at least part of a roof of the vehicle over the passenger compartment;
   a second roof panel coupled to at least one of the first roof support and the second roof support to define at least part of a roof of the vehicle over the cargo compartment; and
   a first panel support surface adjacent to and vertically below the first roof support and a second panel support surface adjacent to and vertically below the second roof support, wherein the first roof panel is adapted to be released from the first roof support and the second roof support and moved to a second position in which the first roof panel is received between the panel support surfaces and the roof supports, wherein the first and second panel support surfaces are located within at least a portion of the cargo compartment and beneath at least part of the second roof panel, and the first roof panel is adapted to be removably attached to the first and second panel support surfaces when the first roof panel is in the second position.

2. The vehicle of claim 1 wherein, the first roof panel is releasable coupled to the first and second roof supports with at least one attachment mechanism, and when the first roof panel is in the second position, the first roof panel is connected to one or both of the first panel support surface and the second panel support surface by at least one attachment mechanism which may be the same as or different than the at least one attachment mechanism providing the releasable coupling to the first and second roof supports.

3. The vehicle of claim 1 wherein the first panel support surface is integrally formed in the first roof support and the second panel support surface is integrally formed in the second roof support.

4. The vehicle of claim 1 wherein the first roof panel includes front panels and intermediate panels that are releasably coupled to each other and to the first and second roof supports, and the second roof panel is releasably coupled one or more of the intermediate panels and fixed to the first and second roof supports.

5. The vehicle of claim 4 wherein the front panels, the intermediate panels, and the second roof panel each have an inner surface and an outer surface opposite the inner surface, wherein the outer surface of one or more of the front panels or intermediate panels is adjacent the inner surface of the second roof panel when the front panels or intermediate panels are positioned vertically beneath the second roof panel.

6. A vehicle comprising:

a body;

a first roof support and a second roof support spaced from the first roof support, the first roof support and the second roof support being coupled to or defining part of the body;

a roof panel releasably coupled to at least one of the first roof support and the second roof support to define at least part of a roof of the vehicle; and a first panel support surface adjacent to the first roof support and a second panel support surface adjacent to the second roof support, wherein the roof panel is adapted to be released from the first roof support and the second roof support and received between the panel support surfaces and the roof supports, wherein the first roof support and the second roof support each comprise a vertical thickness, extend along the vehicle in a fore-aft direction, and the first roof support is spaced from the second roof support in a cross-car direction, and wherein the first and second roof supports are configured to support the first roof panel when the first roof panel is positioned vertically above or below the first and second roof supports.

7. A vehicle comprising:

a first roof support and a second roof support spaced laterally from the first roof support;

a first front panel coupled to the first roof support and a second front panel that is coupled to the second roof support;

a first intermediate panel coupled to the first and second roof supports and in contact with the first and second panels;

a second intermediate panel coupled to the first roof support and a third intermediate panel that is coupled to the second roof support;

a rear roof panel coupled to the first and second roof supports and in contact with the second and third intermediate panels; and a first panel support surface adjacent the first roof support and a second panel support surface adjacent to the second roof support, wherein the first and second front panels, the first intermediate panel, and the second and third intermediate panels are adapted to be released from the first roof support and the second roof support, wherein the first and second front panels, the first intermediate panel, or the second and third intermediate panels may be received between the panel support surfaces and the roof supports.

8. The vehicle of claim 7 wherein the roof supports extend along the vehicle in a fore-aft direction and include one or more fastener holes which are positioned to correspond to one or more fastener openings formed in the roof panels.

9. The vehicle of claim 8 wherein the fastener openings each include a threaded bushing.

10. The vehicle of claim 8 wherein the fastener openings each include a weld nut assembly.

11. The vehicle of claim 7 which includes an exterior and an interior comprising a passenger compartment and a cargo compartment, wherein the first and second front panels and intermediate panels are positioned to define a portion of the exterior of the vehicle above the passenger compartment and cargo compartment in a first position.

12. The vehicle of claim 11 wherein the first and second front panels are coupled to each other and removably attached to the first roof support and the second roof support in the second position and defines at least part of the interior of the vehicle.

13. The vehicle of claim 11 wherein the first intermediate panel is removably attached to the first roof support and the second roof support in the second position and defines at least part of the interior of the vehicle.

14. The vehicle of claim 11 wherein the second and third intermediate panels are coupled to each other and are removably attached to the first roof support and the second roof support in the second position and defines at least part of the interior of the vehicle.

* * * * *